UNITED STATES PATENT OFFICE.

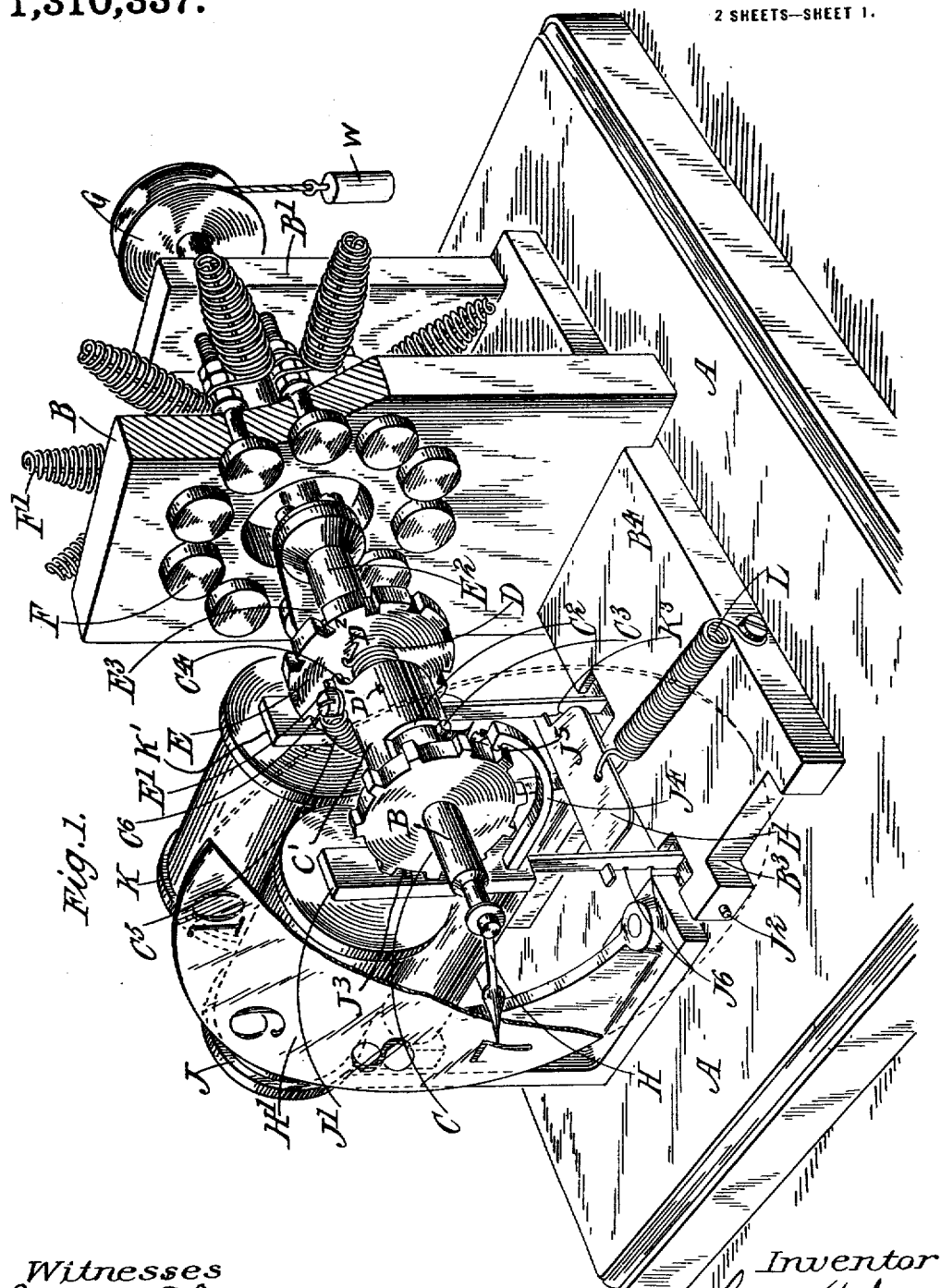

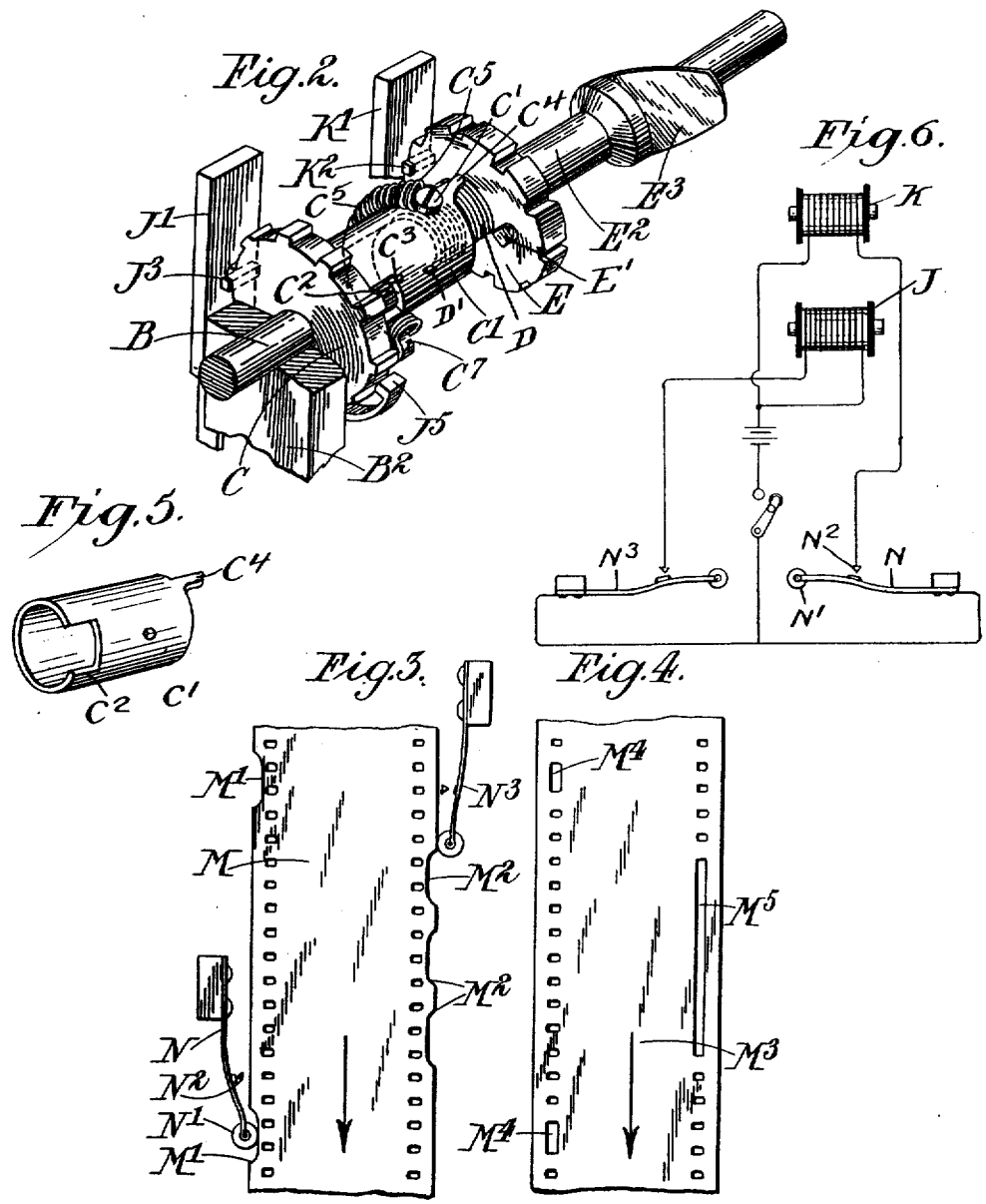

CECIL MILTON HEPWORTH, OF LONDON, ENGLAND.

APPARATUS FOR EXPOSING CINEMATOGRAPH POSITIVE FILMS.

1,310,337.  Specification of Letters Patent.  Patented July 15, 1919.

Application filed June 5, 1918. Serial No. 238,373.

*To all whom it may concern:*

Be it known that I, CECIL MILTON HEPWORTH, a subject of the King of England, residing in London, England, have invented certain new and useful Improvements in Apparatus for Exposing Cinematograph Positive Films, of which the following is a specification.

This invention is for improvements in or relating to apparatus for exposing cinematograph positive films and has for its object to provide means whereby the positive film can be more readily made of equal intensity throughout than is possible with present methods of exposure.

As is well-known, the negative film consists of strips whose degre of intensity varies and heretofore this strip has been provided with notches along one side which operate a switch to vary the itensity of the light whereby the exposure of the positive is being made so that more light is available for those sections receiving the impression from a dense part of the negative than is available for those portions which are receiving impressions from a less dense portion of the negative. With present methods, 10 degrees of light intensity are employed and it has only been possible to set the apparatus for, say, 10 changes, so that after 10 sections of strip each requiring a change has been operated upon, the apparatus had to be again set before the exposure could be proceeded with.

The object of the present invention is to enable as many changes to be made as is required for the whole length of the strip, without any re-setting of the apparatus, the apparatus in fact being self-setting.

According to this invention, there is combined with a source of light and a rotatable electric circuit-selector to control that light, which selector is itself controlled by means operated by the negative film, a stop for the said selector, means for automatically advancing the stop intermittently, and means for controlling the intermittent advance by the movement of the negative film.

Preferably the control means for the stop for the selector is arranged to fully advance the stop to the next position for the selector before the controlling means for the selector is operated to impart any movement to the latter. The stop for the selector may be operatively-connected to the selector by yielding means which tends to advance the selector when the stop is advanced, and the selector is then held against such advance by a catch which is released by the controlling means operated by the film.

The advance of the stop may be controlled by electrically-controlled contact-devices coöperating with notches or slots at or near one edge of the film, and the advance of the selector controlled by other contact-devices coöperating with notches or slots at or near the other edge of the film.

In the accompanying drawings which illustrate one method of carrying out this invention:—

Figure 1 is a perspective view of the selector and stop-mechanism with parts broken away for the sake of clearness;

Fig. 2 is a perspective view of the main operative parts shown in a different position;

Fig. 3 is a diagram illustrating a portion of the negative film and the contact-devices for coöperation therewith;

Fig. 4 is a portion of film constructed for coöperation with a different form of contact-device;

Fig. 5 is a perspective view of the sleeve $C'$, and

Fig. 6, is a diagram showing the electrical connections for the magnets.

The same letters indicate the same parts throughout the drawings.

On the base $A$, supports are provided for a shaft $B$. One of the supports is shown at $B^1$ in Fig. 1 and the other support at $B^2$ in Fig. 2. In Fig. 1, the support $B^2$ has been removed from the recess $B^3$ in the base-plate $B^4$.

Fast on the shaft $B$ is a toothed disk $C$. At the side of the disk is a sleeve $C^1$ which is concentrically disposed to the shaft $B$. The sleeve at one end incloses one end of a spiral spring $D$ which surrounds the shaft $B$ and at the other end is slotted at $C^2$, and projecting into the slot is a pin $C^3$ which is fast on the shaft $B$.

One end of the spring $D$ is secured to the sleeve $C^1$ as indicated at $D^1$ and the other end is made fast at $D^2$ to a second toothed disk $E$ which is mounted free on the shaft $B$. The sleeve $C^1$ has a projecting finger $C^4$ at that end which is near the disk $E$, and the disk is provided with a projection $E^1$ which lies in the path of this finger $C^4$.

A spiral spring $C^5$ is secured at one end to the sleeve $C^1$ by a screw $C^6$ and at the other end to the disk C by a screw $C^7$.

The disk E has a sleeve $E^2$ from which projects selector-arm $E^3$. The selector arm sweeps over the contacts F of a rheostat, the resistances of which are shown at $F^1$.

At one end of the shaft a pulley G is mounted to which is attached a cord carrying a weight which tends constantly to rotate the shaft B clockwise as seen from its other end. Alternatively, if desired, the pulley G may have frictional engagement with the shaft B, so that although the pulley continuously rotates, the shaft can remain stationary when it is held as hereinafter described. At the other end of the shaft is a pointer H which coöperates with an indicator-dial $H^1$.

At the sides of the disks C and E electromagnets J and K are provided. The electromagnet J coöperates with a vertically-situated armature $J^1$ which is pivoted at its lower end to a pin $J^2$ secured in the base and has a pallet $J^3$ on that face of it which is toward the wheel C and an arm $J^4$ which projects around to the other side of the wheel and is provided on that side with a second pallet $J^5$. The armature is kept toward the wheel by a spring L which is connected to a cross-bar $L^1$ having engagement at one end with one of a series of notches $J^6$ provided in the lower end of the armature-member $J^1$.

The other electro-magnet K is provided with an armature $K^1$ having a pallet $K^2$ on that side which is toward the disk E. This armature is pivoted at its base and the lower end of the armature-member is provided with notches $K^3$ with one of which the bar $L^1$ has engagement so that the one spring L tends to keep both of these armatures up against their respective wheels C and E.

The means for energizing the electro-magnets J and K may take any desired form and constitute no part of the present invention. It is already known to operate an electromagnet for effecting a change of light in apparatus of this kind, and such change is effected by means of a contact which drops into notches at one edge of the negative film. For the purpose of this invention, two such contact-devices are provided coöperating with opposite sides of the film. The film is shown at M, Fig. 3, and the notches commonly employed are indicated at $M^1$. The contact-device N is shown diagrammatically merely and comprises a roller $N^1$ which, when it drops into the notch $M^1$, causes its carrying-arm to come against a contact-piece $N^2$, whereby the electrical circuit with the electro-magnet K is completed. At the other edge of the film, notches $M^2$ are provided which coöperate with another contact-device $N^3$ whose construction and operation may be the same as the contact-device N, but is in circuit with the electro-magnet J and closes this when it drops into a notch $M^2$.

The operation of this apparatus is as follows:—

The notches $M^1$ are arranged as before in the film to effect a change of light at the moment any one notch passes the contact-device. The other notches $M^2$ are arranged between any two of the notches $M^1$ and are of such number as to step the stop $C^4$ for the selector $E^3$ around to the point to which the selector will need to be advanced when the next notch $M^1$ comes into operation. The pointer H is shown in Fig. 1 as resting against the numeral 7 and it corresponds to the position occupied by the selector $E^3$ on the rheostat F, $F^1$. If now it is desired that the selector shall be moved at the next change over three contacts which will bring the pointer H to the figure 10, three notches $M^2$ are provided between the notch $M^1$ which is already at, or has passed, the contact N and the next. As soon as a notch $M^2$ comes opposite the contact $N^3$ the circuit of the electromagnet J is closed. This draws the armature $J^1$ toward the electromagnet and thus releases the pallet $J^2$ from the teeth of the disk C, but brings the pallet $J^5$ into the path of the next tooth. As the shaft B is always trying to turn clockwise, as viewed from the indicator end, the shaft will immediately advance with the disk C half a tooth space where it will be arrested by the pallet $J^5$, but directly the notch $M^2$ has passed the contact-device $N^3$, the electro-magnet J will be deënergized and the spring L will cause the armature to return toward the wheel C, which will release the pallet $J^5$ and bring the pallet $J^3$ again into position. By this means the disk C will complete another half-tooth movement which will bring the pointer H from 7 to 8. The next two notches $M^2$ cause the pointer H to advance respectively to the figures 9 and 10, but the selector $E^3$ so far has not moved. The stop $C^4$, however, has been moved away from the pin $E^1$ on the disk E and as soon as the next notch $M^1$ comes opposite the contact-device N, the circuit of the electro-magnet K is closed and the armature $K^1$ is drawn toward it so that its pallet $K^2$ releases the disk E. No second pallet is required here as the disk E immediately advances under the tension of the spring D, which spring has been loaded by the advance of the sleeve $C^1$, until the projection $E^1$ is arrested by the stop $C^4$. The spring $C^5$ serves as a buffer to take the shock of the projection $E^1$ against the stop $C^4$, but otherwise the sleeve $C^1$ and the disk C move as one member. This movement of the disk E carries the selector-arm $E^3$ around to the position on the rheostat F, $F^1$, which corresponds to figure 10 of the indicator, and thus the requisite change of light is effected.

It will be seen that any number of such changes may be brought about in a length of film without any re-adjustment of the apparatus as it is only necessary to put sufficient notches M² at the edge of the film between any two notches M¹ to insure that the proper change shall be effected.

In Fig. 4 another portion of film M³ is shown, which, instead of being provided with notches, is provided with slots M⁴ and M⁵. These slots effect the same purpose as the notches, the contact-devices being varied to suit them, for example, the film could pass over a roller constituting one contact-element and the rollers of the contact-device would run upon the film instead of against the edge of it, so that when they drop into one or other of the notches they would complete their respective circuits.

By having a continuous notch such as M⁵, the advance of the disk C or its equivalent may be effected by a continuous movement, in which case the second pallet J⁵ would be dispensed with and the disk would be allowed to turn under the action of the shaft B so long as the pallet J³ was held away from it, which would depend upon the length of the slot M⁵.

Again, the notches M¹ and M² need not be on different sides of the film as they could be on the same side, the contact-members or the notches being so varied that only one contact-member will operatively enter the notches M¹ and the other will only operatively enter the notches M².

What I claim as my invention and desire to secure by Letters Patent is:—

1. In apparatus for exposing cinematograph positive films, the combination of a rotatable electric circuit-selector to control the source of light for the exposure, means tending always to angularly advance the said selector, means operated by the movement of the negative film to control the moment of advance of the selector, a stop to limit the angular movement of the selector, means for automatically advancing the said stop intermittently, and means for controlling the intermittent advance of said stop by the movement of the negative film, substantially as set forth.

2. In apparatus for exposing cinematograph positive films, the combination of a rotatable electric circuit-selector to control the source of light for the exposure, means tending always to angularly advance the said selector, means operated by the movement of the negative film to control the moment of advance of the selector, a stop to limit the angular movement of the selector, means for automatically advancing the said stop intermittently, and means for controlling the intermittent advance of said stop by the movement of the negative film, the control by the movement of the said film for the circuit-selector and its stop being so arranged that the stop is fully advanced for the next position of the selector before the controlling means for the said selector is operated to bring about the advance of the selector, substantially as set forth.

3. In apparatus for exposing cinematograph positive films, the combination of a rotatable electric circuit-selector to control the source of light for the exposure, a stop to limit the angular movement of the said selector, means for automatically advancing the said stop intermittently, yielding means operatively connecting the stop with the selector in such manner that the latter always tends to follow the stop after it has been advanced, means for controlling the intermittent advance of said stop by the movement of the negative film, and means operated by the movement of the negative film, to control the time of operation of said yielding means to advance the selector after the stop.

4. In apparatus for exposing cinematograph positive films the combination of a rotatable electric circuit-selector to control the source of light for the exposure, means tending always to angularly advance the said selector, a retaining catch for the selector, a member yieldingly pressed against the negative film and operatively connected with the selector catch in such manner that when the member drops into a cut-away portion of the film it releases the catch, a stop to limit the angular movement of the selector, means for automatically advancing the said stop intermittently, and means for controlling intermittent advance of said stop by the movement of the negative film, substantially as set forth.

5. In apparatus for exposing cinematograph positive films, the combination of a rotatable electric circuit-selector to control the source of light for the exposure, means tending always to angularly advance the said selector, a retaining catch for the selector, a member yieldingly pressed against the negative film and operatively connected with the selector catch in such manner that when the member drops into a cut-away portion of the film it releases the catch, a stop to limit the angular movement of the selector, means comprising an escapement device for intermittently advancing the said stop, and a member yieldingly pressed against the negative film and operatively connected with the said escapement device so that when the member drops into a cut-away portion of the film it imparts a one step release to the escapement, substantially as set forth.

6. In apparatus for exposing cinematograph positive films, the combination of a shaft, a rheostat whereof the points of contact are arranged around the shaft, an arm constituting a circuit-selector carried by the shaft but free to swing around the same over the contact points of the rheostat, a toothed member connected with the arm and having its toothed periphery concentric with the shaft, a catch which engages the teeth of the toothed member and locks it against movement, means operated by the movement of the negative film and operatively connected with the catch to release the same when certain points of the film are reached, a spring made fast at one end relatively to the shaft and at the other end relatively to the circuit-selector arm, means always tending to rotate the shaft in the direction to load this spring, a toothed member fast on the shaft, an escapement mechanism engaging the teeth of the latter member, means for controlling the movement of the escapement mechanism by the movement of the negative film, and a stop carried by the shaft and arranged to limit the angular movement of the selector arm but disposed in advance of the same so that when the catch holding the arm back is released it advances the distance permitted by the stop.

7. In apparatus for exposing cinematograph positive films, the combination of an electric circuit-selector in the form of an arm which moves over contact points disposed in a circular path, to control the source of light for the exposure, means tending always to angularly advance the said selector, means operated by the movement of the negative film to control the moment of advance of the selector, a stop movable in a circular path in advance of the selector to limit the angular movement of the same, means for automatically advancing the said stop intermittently, and means for controlling the intermittent advance of said stop by the movement of the negative film, substantially as set forth.

In testimony whereof I affix my signature.

CECIL MILTON HEPWORTH.